United States Patent
Yin et al.

(10) Patent No.: US 12,223,416 B2
(45) Date of Patent: Feb. 11, 2025

(54) NEURAL NETWORK RETRAINING METHOD BASED ON AGING SENSING OF MEMRISTORS

(71) Applicant: ZHEJIANG UNIVERSITY, Zhejiang (CN)

(72) Inventors: Xunzhao Yin, Zhejiang (CN); Wenwen Ye, Zhejiang (CN); Cheng Zhuo, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/028,566

(22) PCT Filed: Apr. 29, 2022

(86) PCT No.: PCT/CN2022/090124
§ 371 (c)(1),
(2) Date: Mar. 27, 2023

(87) PCT Pub. No.: WO2023/201773
PCT Pub. Date: Oct. 26, 2023

(65) Prior Publication Data
US 2024/0005134 A1    Jan. 4, 2024

(30) Foreign Application Priority Data

Apr. 22, 2022   (CN) .......................... 202210427530.9

(51) Int. Cl.
*G06N 3/063* (2023.01)
*G06N 3/084* (2023.01)

(52) U.S. Cl.
CPC ............. *G06N 3/063* (2013.01); *G06N 3/084* (2013.01)

(58) Field of Classification Search
CPC ........ G06N 3/063; G06N 3/065; G06N 3/084; G06N 3/096; Y02D 10/10
See application file for complete search history.

(56) References Cited

U.S. PATENT DOCUMENTS

| | | | |
|---|---|---|---|
| 10,510,003 | B1 | 12/2019 | Olabiyi et al. |
| 2015/0046382 | A1 | 2/2015 | Rangan |
| | | (Continued) | |

FOREIGN PATENT DOCUMENTS

| | | |
|---|---|---|
| CN | 111931924 | 11/2020 |
| CN | 113610220 | 11/2021 |
| TW | 202207093 | 2/2022 |

OTHER PUBLICATIONS

Mozaffari, Seyed Nima, Krishna Prasad Gnawali, and Spyros Tragoudas. "An aging resilient neural network architecture." Proceedings of the 14th IEEE/ACM International Symposium on Nanoscale Architectures. 2018. (Year: 2018).*

(Continued)

*Primary Examiner* — Randall K. Baldwin
(74) *Attorney, Agent, or Firm* — JCIPRNET

(57) ABSTRACT

A neural network retraining method based on the aging sensing of memristors is provided. For the accuracy rate of hardware online reasoning decreases after cross-array aging, the extreme values of programmable weights under a current aging condition is calculated by using the known aging information of memristor, and a neural network model is retrained according to this, so as to improve the accuracy rate of the current hardware online reasoning. In the process of retraining, network weights exceeding the extreme values of programmable weights are automatically truncated. For the working life of the memristor, the sparsity of derivatives of the neural network is utilized to discard the derivatives with a small absolute value in hardware adjustment process, so as to ensure that the memristor corresponding to small (Continued)

derivatives would not be applied voltage, prevent the aging process of the memristors and prolong the service life thereof.

6 Claims, 5 Drawing Sheets

(56) References Cited

U.S. PATENT DOCUMENTS

| | | | |
|---|---|---|---|
| 2019/0164046 A1 | 5/2019 | Song et al. | |
| 2020/0227635 A1 | 7/2020 | Yang et al. | |
| 2021/0143834 A1 | 5/2021 | Kvatinsky et al. | |
| 2021/0225440 A1* | 7/2021 | Sharma | G06F 11/1068 |
| 2022/0375520 A1* | 11/2022 | Yi | G11C 7/1006 |
| 2023/0267997 A1* | 8/2023 | Dang | G11C 13/0035 |
| | | | 365/148 |

OTHER PUBLICATIONS

Lim, Suhwan, et al. "Adaptive learning rule for hardware-based deep neural networks using electronic synapse devices." Neural Computing and Applications 31 (2019): 8101-8116. (Year: 2019).*

Gao, Di, et al. "Reliable memristor-based neuromorphic design using variation-and defect-aware training." 2021 IEEE/ACM International Conference On Computer Aided Design (ICCAD). IEEE, 2021. (Year: 2021).*

Liao, Zhiheng, Jingyan Fu, and Jinhui Wang. "Ameliorate performance of memristor-based ANNs in edge computing." IEEE Transactions on Computers 70.8 (2021): 1299-1310. (Year: 2021).*

Gao, Di, et al. "Bayesian inference based robust computing on memristor crossbar." 2021 58th ACM/IEEE Design Automation Conference (DAC). IEEE, 2021. (Year: 2021).*

Yin, Xunzhao, et al. "Deep random forest with ferroelectric analog content addressable memory." arXiv preprint arXiv:2110.02495 (2021). (Year: 2021).*

Song, Shihao, et al. "Dynamic reliability management in neuromorphic computing." ACM Journal on Emerging Technologies in Computing Systems (JETC) 17.4 (2021): 1-27. (Year: 2021).*

Yao, Peng, et al. "Fully hardware-implemented memristor convolutional neural network." Nature 577.7792 (2020): 641-646. (Year: 2020).*

Yang, Xiaoxuan, et al. "Research progress on memristor: From synapses to computing systems." IEEE Transactions on Circuits and Systems I: Regular Papers 69.5 (Mar. 2022): 1845-1857. (Year: 2022).*

"International Search Report (Form PCT/ISA/210) of PCT/CN2022/090124," mailed on Jan. 3, 2023, pp. 1-5.

"Written Opinion of the International Searching Authority (Form PCT/ISA/237) of PCT/CN2022/090124," mailed on Jan. 3, 2023, pp. 1-4.

Simone Balatti et al., "Voltage-Controlled Cycling Endurance of HfOx-Based Resistive-Switching Memory," IEEE Transactions on Electron Devices, vol. 62, Oct. 2015, pp. 3365-3372.

Shuhang Zhang et al., "Aging-aware Lifetime Enhancement for Memristor-based Neuromorphic Computing," 2019 Design, Automation & Test in Europe Conference & Exhibition (Date), Mar. 2019, pp. 1751-1756.

* cited by examiner

NEURAL NETWORK RETRAINING METHOD BASED ON AGING SENSING OF MEMRISTORS

CROSS-REFERENCE TO RELATED APPLICATION

This application is a 371 of international application of PCT application serial no. PCT/CN2022/090124, filed on Apr. 29, 2022, which claims the priority benefit of China application no. 202210427530.9, filed on Apr. 22, 2022. The entirety of each of the above mentioned patent applications is hereby incorporated by reference herein and made a part of this specification.

FIELD OF TECHNOLOGY

The present invention relates to the field of storage and computing integration, and particularly to a neural network retraining method based on the aging sensing of memristors, which is helpful to improve an accuracy rate of hardware reasoning and prolong the service life of a cross-array of the aging memristors.

BACKGROUND

With the advent of the era of big data, non-volatile devices, such as memristors, have brought the possibility of realizing efficient and low-power in-memory computing. Existing studies have demonstrated the great potential of memristor-based cross-array circuits in neuromorphic acceleration computing. When synaptic weights of a trained neural network is mapped to the resistance of the cross-array, a high voltage pulse is applied to realize the programming. Due to the decrease of hardware reasoning accuracy rate caused by quantization during programming mapping, it is necessary to apply a fine tuned voltage to adjust the resistance stored in the memristor to get the reasoning accuracy rate meeting the requirements. Repeated application of voltage would cause irreversible changes in the internal filaments of the memristor, a phenomenon known as aging. After aging, the programmable range of the memristor is reduced, so the value of the target weight is very likely to fall outside the actual effective range of the memristor after the programming mapping, resulting in great programming errors, and further resulting in the decrease of the accuracy rate of the neural network. Therefore, the need for more times to apply voltage to perform the hardware online adjustment, which further aggravates the aging of the memristors.

In order to solve the aging problem of memristors, existing researches can improve the endurance of memristors by adjusting the programming voltage or changing the cascade resistance at the device level. In order to alleviate the aging phenomenon of the memristor-based cross-array, some studies put forward the method of switching rows and columns and skew training the neural network, so as to improve the service life of the whole device. However, the above methods fail to make full use of the information of the current aging condition of the device, and in the face of the deterioration of the hardware reasoning accuracy rate caused by the aging of the memristors, no good improvement is proposed.

In summary, it has become an important technical issue to provide a neural network retraining method based on the aging sensing of memristors, which improves the hardware reasoning accuracy rate of the aging cross-array of memristors and prolongs its service life by using the known aging information.

SUMMARY

The present invention aims to provide a neural network retraining and gradient sparse method based on the aging sensing of memristors in view of an aging condition of the current cross-array of the memristors. By using the aging information of memristors, the neural network can be retrained and the gradient sparse technology can be used for an online hardware adjustment. The hardware reasoning accuracy rate and the service life of the cross-array of the memristors under the aging condition are improved.

The purpose of the present invention is realized by the following technical solution:

A neural network retraining method based on the aging sensing of memristors, wherein the method comprises the following steps:

S1, collecting aging information of the memristors and calculating an effective programmable resistance range of the aged memristors:

$$R_{max}^{aged} = R_{max}^{fresh} - G(T,t)$$

$$R_{min}^{aged} = R_{min}^{fresh} - H(T,t)$$

wherein, $R_{max}^{aged}$ and $R_{min}^{aged}$ are respectively the maximum and minimum values of the programmable resistance after aging of the memristors of a cross-array; $R_{max}^{fresh}$ and $R_{min}^{fresh}$ are respectively the maximum and minimum programmable resistance that can be stored by a new memristor; and G(T, t) and H(T, t) are an Arrhenius aging equation, of which parameters can be extracted through measurement data;

S2, based on the programmable resistance range obtained in S1, calculating reciprocal values respectively to obtain a programmable conductivity range of the aged memristor in which the maximum and minimum values are respectively $G_{max}^{aged}$ and $G_{min}^{aged}$, and calculating the maximum and minimum values of programmable weight parameters in a neural network task to be executed according to the following formula:

$$W_{min}^{aged} = \left(G_{min}^{aged} - G_{min}^{fresh}\right) \frac{W_{max} - W_{min}}{G_{max}^{fresh} - G_{min}^{fresh}} + W_{min}$$

$$W_{max}^{aged} = \left(G_{max}^{aged} - G_{min}^{fresh}\right) \frac{W_{max} - W_{min}}{G_{max}^{fresh} - G_{min}^{fresh}} + W_{min}$$

wherein, $G_{max}^{fresh}$ and $G_{min}^{fresh}$ are respectively the maximum and minimum conductances that can be stored by the new memristor in the cross-array, and $W_{max}^{aged}$ and $W_{min}^{aged}$ are respectively the maximum and minimum values of the programmable weights corresponding to the cross-array, and $W_{max}$ and $W_{min}$ are respectively the maximum and minimum values of synaptic weights in an initial model of the neural network;

S3, retraining the existing neural network model based on the extreme values of the programmable weight parameters of the neural network;

S4, mapping the adjusted synaptic weight parameters of the neural network to the memristor-based cross-array so as to obtain a resistance value of a basic memory unit;

S5, classifying the derivatives into two groups according to the positive and negative values of the derivatives obtained by a neural network backward propagation method, calculating the average values of the two groups of derivatives of positive and negative values respectively, and ignoring the derivatives of which absolute values are lower than the average values, that is, setting the derivatives as 0; and then performing online hardware fine tuning on the resistance stored by the corresponding memristor according to the current derivative value, that is, applying positive and negative voltages corresponding to the derivative symbol to the memristor:

$$V_{ij} = \begin{cases} +V_0 & \text{if } grad_{ij} < 0 \\ -V_0 & \text{if } grad_{ij} > 0 \end{cases}$$

wherein, $grad_{ij}$ is the derivative obtained by calculating the derivative of neural network Loss function value Loss with respect to weight $w_{ij}$, Loss is a hardware reasoning result and an actual loss function value; $V_0$ is a standard voltage applied to the memristor memory unit during online adjustment; $V_{ij}$ is the voltage applied to the memristor memory unit in row i and column j of the cross-array; and repeating the process until the online hardware reasoning accuracy rate thereof meets the requirement, which is manually specified.

Further, S3 specifically comprises:

truncating a weight beyond the range of programmable parameters and directly assigning the truncated weight as the maximum weight value or minimum weight value nearest to the current value, and based on the current truncated parameters, propagating backward the neural network to obtain the derivatives and continuing to adjust the parameters; and repeating the above operations until the parameters meet the programmable weight range and the accuracy rate of the simulation reasoning is not significantly reduced.

Further, S4 specifically comprises:

S4.1, according to a mapping relationship between weight and conductance, calculating the conductance value G that should be stored by all memristors of the cross-array corresponding to all synaptic weights W of the neural network, wherein the mapping relationship is as follows:

$$G = \frac{G_{max} - G_{min}}{W_{max} - W_{min}}(W - W_{min}) + G_{min}$$

wherein, $W_{max}$ and $W_{min}$ are respectively the maximum and minimum values of the synaptic weights in the neural network model, and $G_{max}$ and $G_{min}$ are respectively the maximum and minimum values of programmable effective conductance of the memristor;

S4.2, according to the reciprocal relationship between conductance and resistance, calculating the reciprocal of the calculated conductance to obtain the resistance value that should be stored by all the memristors in the cross-array: R=1/G, and, $R_{max}$=1/$G_{min}$ and $R_{min}$=1/$G_{max}$, $R_{max}$ and $R_{min}$ are respectively the maximum and minimum values of the programmable resistance of the memristor;

S4.3, applying a voltage to memristors memory unit corresponding to a synaptic position of the neural network so as to store the nearest quantized resistance corresponding to the calculated resistance R;

Further, in S2, calculating the programmable maximum and minimum values of the weights of the neural network is performed with the maximum and minimum values of each layer respectively searched according to the weight of each layer of the current neural network, and the extreme value of the current programmable conductance of the memristor corresponding to each layer of the neural network.

The beneficial effects of the present invention are as follows:

1) improving the hardware reasoning accuracy rate of the memristor-based cross-array under the aging condition. By using the known aging information, the programmable resistance range of the current cross-array is calculated, according to which the neural network is retrained. The weight parameters of the network obtained by this method can better match the hardware under the current aging condition, reduce the partial error caused by the weights beyond the programmable range during mapping, and thus improve the hardware reasoning accuracy rate.

2) prolonging the service life of the memristor-based cross-array. The retrained parameters obtained by using the aging information can best match the current hardware state. Therefore, it is unnecessary to carry out excessive iterative process of online hardware adjustment in order to improve the accuracy rate of the hardware reasoning, so as to avoid further aging of the memristors. In addition, the online adjustment mode of gradient sparsity avoids the problem that the voltage applied to the memristors further deteriorates the aging in the case of redundant gradient adjustment, reduces the number of times when the voltage is applied to the memristors, and prolongs the service life of the cross-array of the memristors.

DESCRIPTION OF THE EMBODIMENTS

In the following, the present invention is further described in detail in combination with the attached drawings and specific embodiments.

Figure 1:
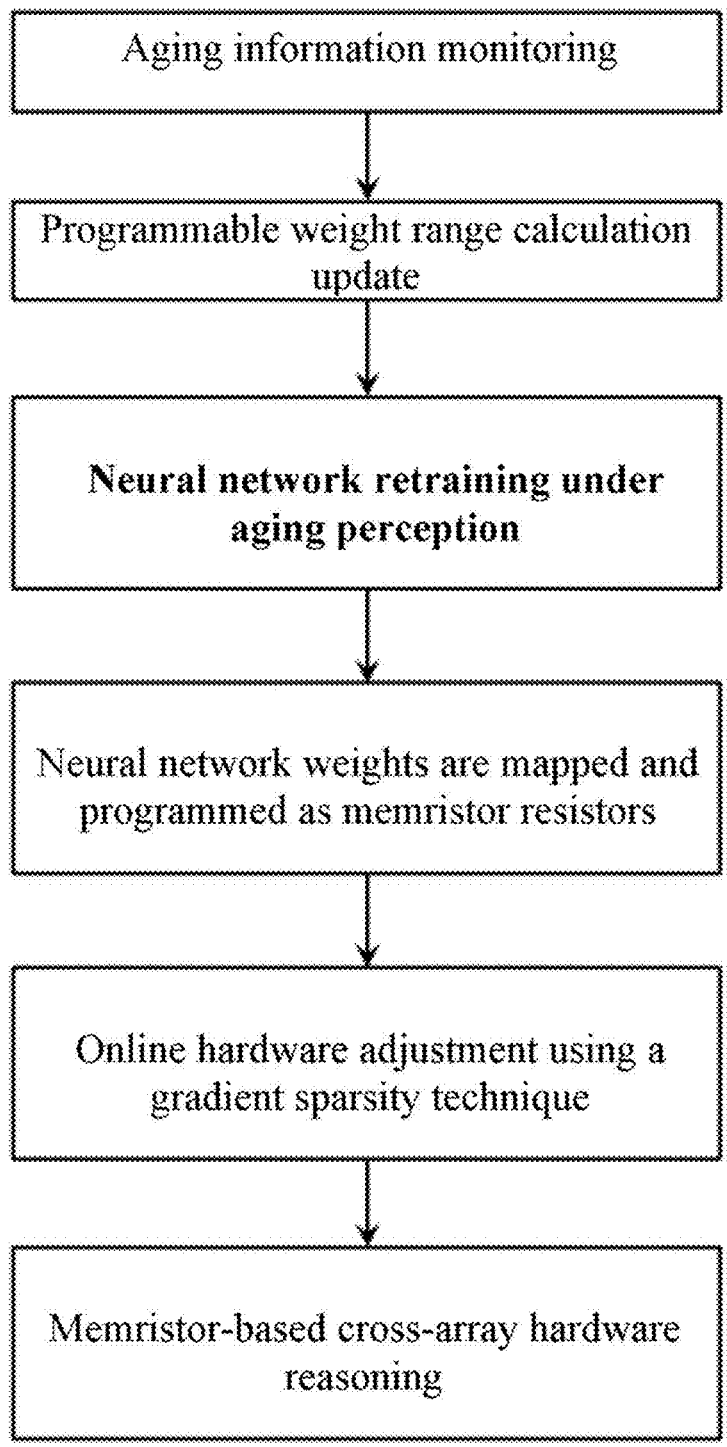
FIG. 1 is a general flow chart for the realization of the present invention.

As shown in FIG. 1, a neural network retraining method based on the aging sensing of memristors proposed in the present invention, wherein the method comprises the following steps:

S1, using an Arrhenius aging model in non-patent literature 1 (S. Balatti et al., "Voltage-Controlled Cycling Endurance of HfOx-Based Resistive-Switching Memory," IEEE Trans. Electron Devices, vol. 62, no. 10, pp. 3365-3372, 2015) to model the aging process of the memristors and collect the aging information of the memristors. The programmable resistance range of the aged memristors can be calculated by the following formula:

$$R_{max}^{aged} = R_{max}^{fresh} - G(T,t)$$

$$R_{min}^{aged} = R_{min}^{fresh} - H(T,t)$$

wherein, $R_{max}^{aged}$ and $R_{min}^{aged}$ are respectively the maximum and minimum values of the programmable resistance after aging of the memristors of a cross-array; and, $R_{max}^{fresh}$ and $R_{min}^{fresh}$ are respectively the maximum and minimum programmable resistance that can be stored by the cross-array of the new memristors which has not yet performed the task. G(T, t) and H(T, t) are an Arrhenius aging equation, and parameters of the Arrhenius aging equation can be extracted through measurement data. T represents a temperature of a memristor and t represents a time of aging of the memristor. For example, based on the non-patent literature 1, G(T, t) and H(T,t) may represent as follows.

$$G(T,t) = (R_{max}^{fresh} - 0.9 R_{min}^{fresh})[1-(1-f(T,t)/fd)^4]$$

$$H(T,t) = 0.1 R_{min}^{fresh}[1-(1-f(T,t)/fd)^4]$$

wherein, fd is a limit of aging of the memristor, and f(T,t) is an aging degree accumulated over time t. According to the non-patent literature 1, f(T,t) may represent as follows $$f(T,t) = \int e - E_A/k_T dt$$

wherein, k is the Boltzmann constant and EA is an energy barrier of an applied voltage.

S2, based on the programmable resistance range obtained in S1, calculating reciprocal values respectively to obtain a programmable conductivity range of the aged memristors in which the maximum and minimum values are respectively $G_{max}^{aged}$ and $G_{min}^{aged}$, and calculating the maximum and minimum values of programmable weight parameters in a neural network task to be executed according to the following formula:

$$W_{min}^{aged} = (G_{min}^{aged} - G_{min}^{fresh}) \frac{W_{max} - W_{min}}{G_{max}^{fresh} - G_{min}^{fresh}} + W_{min}$$

$$W_{max}^{aged} = (G_{max}^{aged} - G_{min}^{fresh}) \frac{W_{max} - W_{min}}{G_{max}^{fresh} - G_{min}^{fresh}} + W_{min}$$

wherein, $G_{max}^{fresh}$ and $G_{min}^{fresh}$ are respectively the maximum and minimum conductances that can be stored by the new memristor in the cross-array, and $W_{max}^{aged}$ and $W_{min}^{aged}$ are respectively the maximum and minimum values of the programmable weights corresponding to the cross-array, and $W_{max}$ and $W_{min}$ are respectively the maximum and minimum values of synaptic weights in an initial model of the neural network. The ranges allowed by the weight parameters in the neural network model corresponds one-to-one with the ranges of conductance that can be stored by all memory units in the cross-array of the memristors.

S3, retraining the existing neural network model based on the extreme values of the programmable weight parameters of the neural network in S2. The specific process is as follows: truncating each weight beyond the range of programmable parameters, and directly assigning the truncated weight as the maximum or minimum value nearest the current weight value:

$$w_{ij} = \begin{cases} w_{min-ij}^{aged}, & \text{if } w_{ij} < w_{min-ij}^{aged}, \\ w_{max-ij}^{aged}, & \text{if } w_{ij} > w_{max-ij}^{aged}. \end{cases}$$

$w_{ij}$ is the weight value of row i and column j of a certain layer of the neural network, and $w_{min-ij}^{aged}$ and $w_{max-ij}^{aged}$ are respectively the minimum and maximum weight values of row i and column j of a certain layer of the neural network that can be successfully mapped to the memristor, corresponding to the minimum and maximum conductance values that can be stored by the aging memristor of row i and column j of the cross-array respectively. Based on the current truncation parameters, calculating the loss function value of the neural network, and propagating backward the neural network to obtain the derivatives and continuing to adjust the parameters; and repeating the above operations until the parameters meet the programmable weight range and the accuracy rate of the software simulation reasoning is not significantly reduced.

Figure 2:
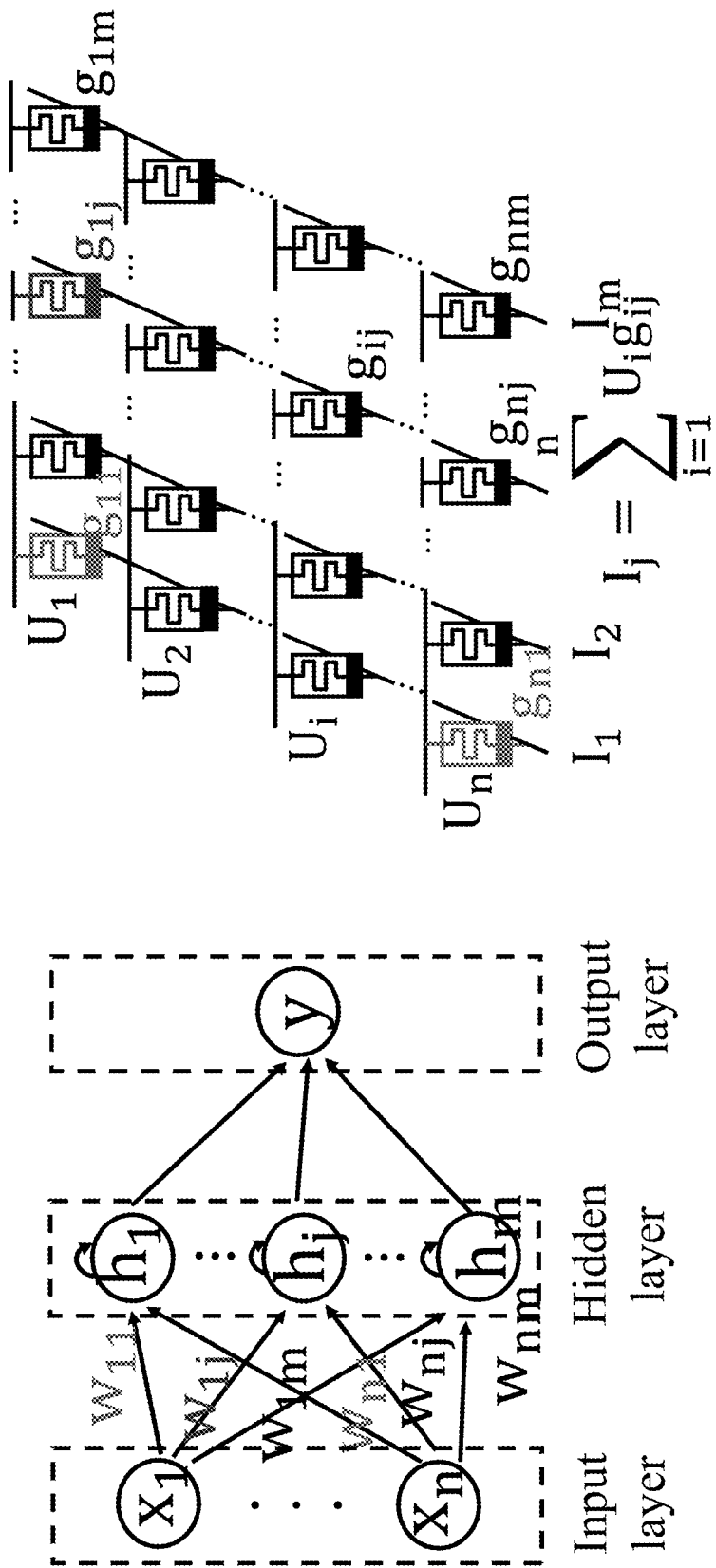
FIG. 2 is a schematic diagram of mapping synaptic weight parameters of the neural network to memristors-based cross-array in the present invention.

S4, mapping the synaptic weight parameters of the neural network after the retraining in S3 one-to-one into the memory units of the cross-array of the memristors hierarchically according to the position correspondence shown in FIG. 2, and mapping them into the resistance values of the basic memory units.

S4.1, according to a mapping relationship between weight and conductance in the following formula, calculating the conductance value G that should be stored by all memristors of the cross-array corresponding to synaptic weights W of the neural network:

$$G = \frac{G_{max} - G_{min}}{W_{max} - W_{min}} (W - W_{min}) + G_{min}$$

wherein, $W_{max}$ and $W_{min}$ are respectively the maximum and minimum values of the synaptic weights in the current neural network model, and $G_{max}$ and $G_{min}$ are respectively the maximum and minimum values of programmable effective conductance of each memory unit of the cross-array.

S4.2, according to the reciprocal relationship between conductance and resistance, calculating the reciprocal of the calculated conductance in S4.1 to obtain the resistance value that should be stored by all the memristors in the cross-array after the programming: R=1/G, and, $R_{max}=1/G_{min}$ and $R_{min}=1/G_{max}$, $R_{max}$ and $R_{min}$ are respectively the maximum and minimum values of the programmable resistance of the memristor.

S4.3, applying a voltage to memristors memory unit corresponding to a synaptic position of the neural network so as to store the nearest quantized resistance corresponding to the calculated resistance R in S4.2.

S5, completing the neural network task in the cross-array.

S5.1, verifying the accuracy rate of the online hardware reasoning of the cross-array.

Figure 3:
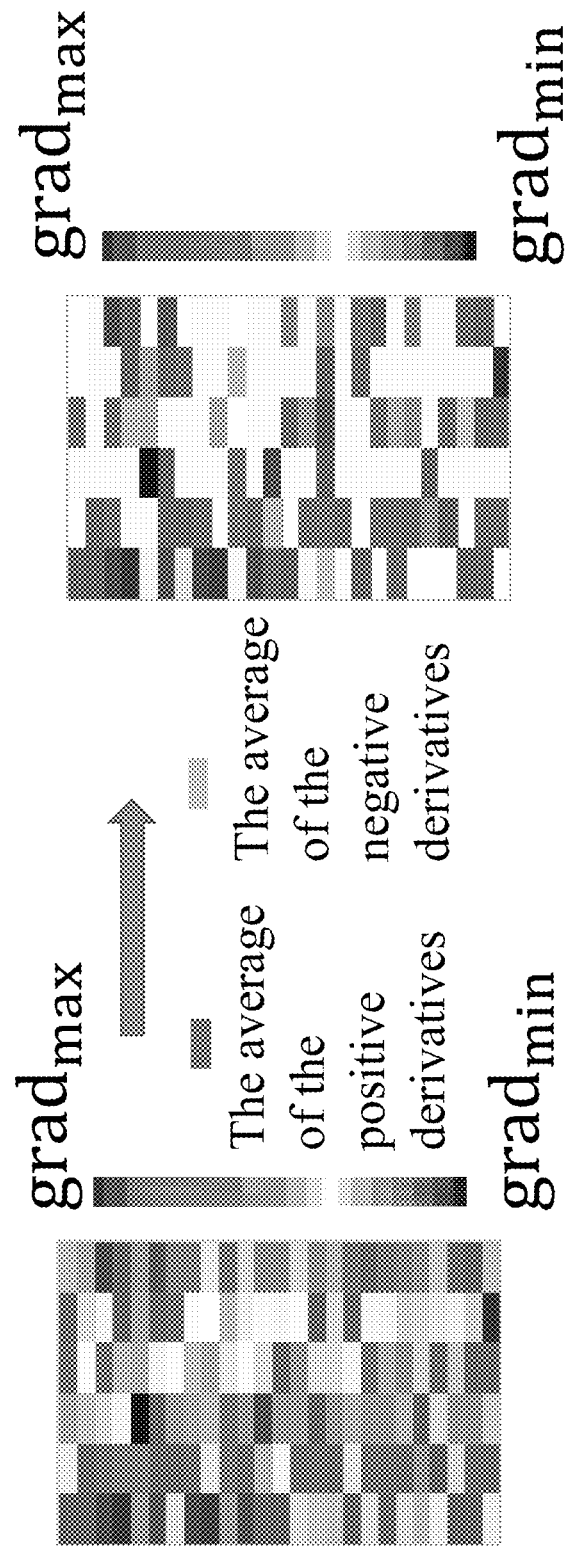
FIG. 3 is a schematic diagram of a gradient sparsity technology of the present invention.

S5.2, if the accuracy rate does not meet the requirements, adjusting online the resistance values stored in the cross-array of memristors, and adopting the sparse gradient technique shown in FIG. 3 in the process of the online adjustment: classifying the derivatives into two groups according to the positive and negative values of the derivatives obtained by a neural network backward propagation method, calculating the average values of the two groups of derivatives of positive and negative values respectively, and ignoring the derivatives of which absolute values are lower than the average values, that is, setting the derivatives as 0. And then performing online hardware fine tuning on the resistance stored by the corresponding memristor according to the current derivative value. The voltage applied to the memristors during the fine tuning process corresponds to the derivative symbol obtained by the sparse gradient technique above:

$$V_{ij} = \begin{cases} +V_0 & \text{if } grad_{ij} < 0 \\ -V_0 & \text{if } grad_{ij} > 0 \end{cases}$$

wherein, $grad_{ij}$ is the derivative obtained by propagating backward to calculate the derivative of neural network Loss function value Loss with respect to weight $w_{ij}$. Loss is a loss function value of hardware reasoning result and an actual result; $V_0$ is a standard voltage value applied to the memristor memory unit during online adjustment; $V_{ij}$ is the voltage applied to the memristor memory unit in row i and column j of the cross-array.

S5.3, repeating the process of S5.2 until the accuracy rate of the online hardware reasoning of the cross-array meets the requirements, wherein the required accuracy rate is artificially specified according to the actual situation and task.

The function and effect of the present invention are further illustrated by the following simulation experiment:

A Simulation Task

In the specific case of applying the system in this embodiment, two classical networks, LeNet-5 and ResNet-18, are selected to perform the classification task of two data sets, Fashion-MNIST and CIFAR-10, respectively. The models of the above two networks are executed in memristors-based cross-array, and the neural network retraining method based on the aging sensing of memristors proposed in the present invention are used for several times to check the effect of each use and the influence of cumulative use on the cross-array.

In addition to experimental verification of the method mentioned in the present invention, the results are also compared with that of the common basic process which does not use this method and the method proposed in the non-patent literature 2 (S. Zhang et al., "Aging-aware Lifetime Enhancement for Memristor-based Neuromorphic Computing," 2019 Design, Automation & Test in Europe Conference & Exhibition (DATE), 2019, pp. 1751-1756). The comparison indexes are mainly the hardware reasoning accuracy rate after weight parameter mapping under the same condition, and the number of hardware online adjustment required to meet the required accuracy rate.

Figure 4:
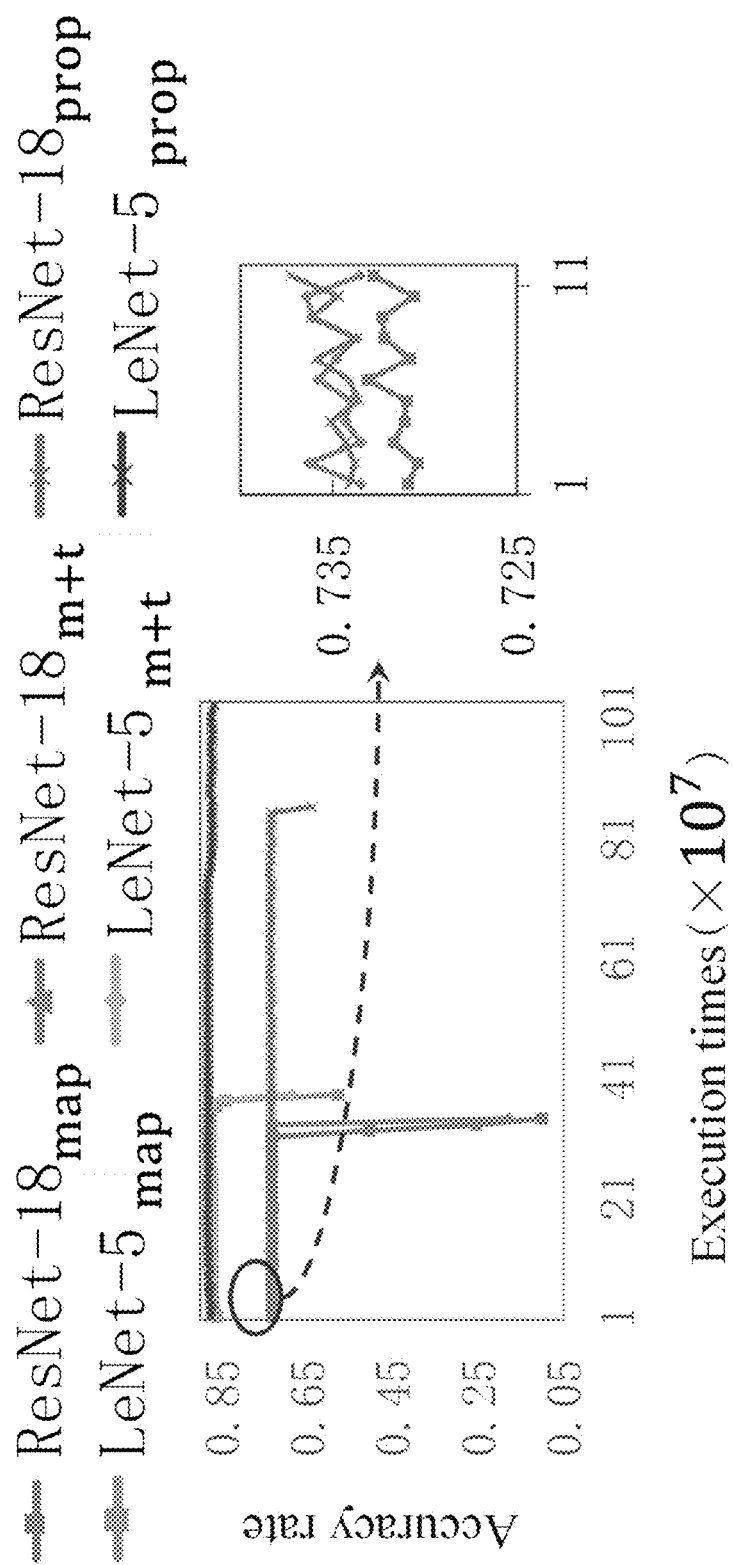
FIG. 4 is a comparison diagram of the accuracy rate of the method of the present invention and other methods.

Simulation Results (1) Comparison of the hardware reasoning accuracy rate after the weight parameter mapping under the same condition FIG. 4 shows the change in reasoning accuracy rate when the neural network is repeatedly executed in the cross-array of the memristors. Through longitudinal comparison, after repeated execution, the aging degree of memristors is aggravated, and the accuracy rate decays seriously. Compared with the basic method which does not use the present invention, the hardware reasoning accuracy rate which use the method in the present invention can be better maintained under the same execution times.

The following table compares the accuracy rate of reasoning performed by the method of the present invention with other methods in a cross-array of memristors with the same degree of aging.

| Network | Initial mapping accuracy rate | | | Online adjustment accuracy rate | | | Online adjustment times | | |
| --- | --- | --- | --- | --- | --- | --- | --- | --- | --- |
| | The method in the present invention | The basic method | Non-patent literature 2 | The method in the present invention | The basic method | Non-patent literature 2 | The method in the present invention | The basic method | Non-patent literature 2 |
| LeNet-5 | 85.9% | 74.0% | 66.9% | 87.4% | 87.4% | 84.3% | 5 | 69 | * |
| ResNet-18 | 72.1% | 69.2% | 67.6% | 73.6% | 73.4% | 73.5% | 1 | 5 | 9 |

* The maximum adjustment limit is reached but the required accuracy rate is not achieved.

It can be seen from the above table that, under a certain aging degree of the cross-array of memristors, when performing the LeNet-5 task, the accuracy rate of the first mapping of the method in the present invention is 16% and 28% higher than that of the basic method and the method in non-patent literature 1, respectively. During the ResNet-18 task, the improvements are 4% and 7%, respectively. The current aging situation is not too bad, so after the online adjustment, it can achieve a similar hardware reasoning accuracy rate. The number of online adjustment required to achieve the accuracy rate is significantly reduced by the method in the present invention. Compared with the basic method and the method of the non-patent literature 1, the number of adjustments can be saved up to 13.8 times and 9 times.

(2) Comparison of Online Hardware Adjustment Times

Figure 5:
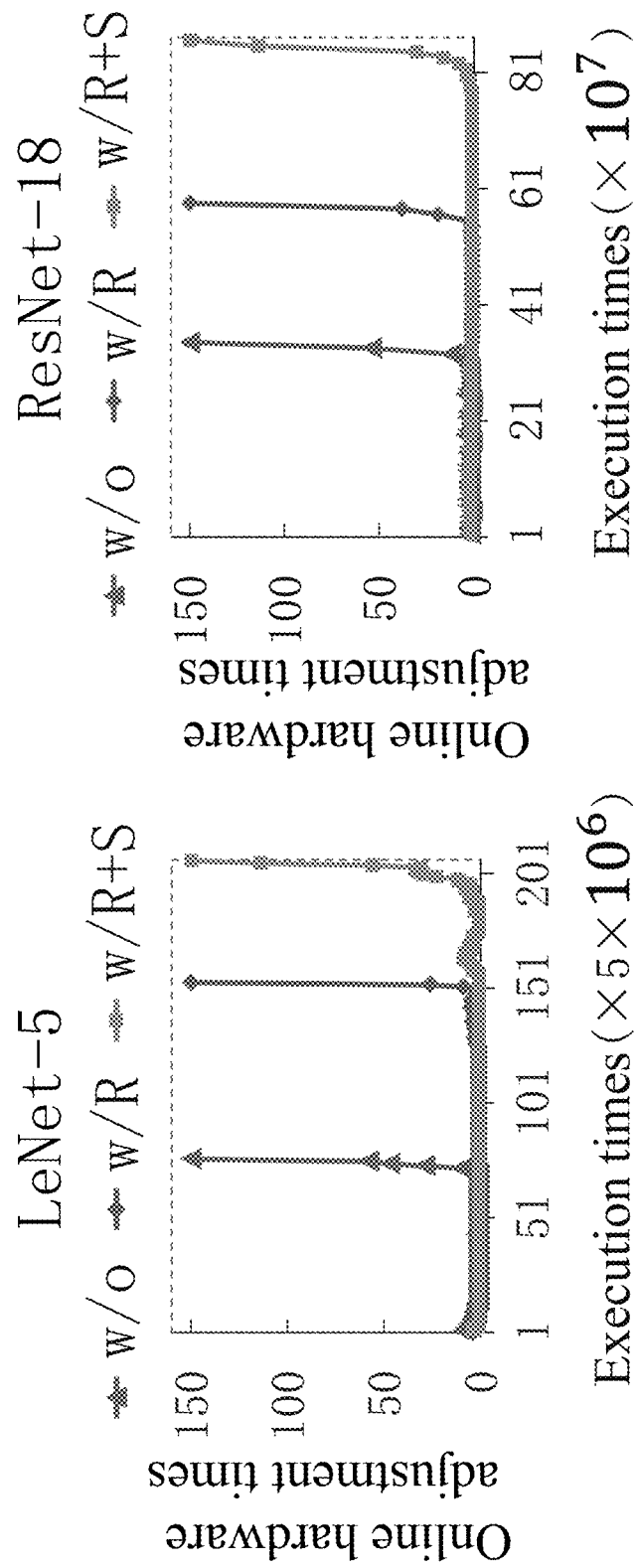
FIG. 5 is a comparison diagram of the service life of cross-arrays of memristors of the method of the present invention and other methods.

FIG. 5 shows the changes in the number of online adjustments required by the cross-array of memristors in order to achieve the required accuracy rate during the repeated execution of the network task. By comparing the method of the present invention with the basic method and the method only using part of the method of the present invention (the retraining part), it is found that only after performing the network task for greatest number of times, the method of the present invention needs more iterations of the online hardware adjustments to achieve the required accuracy rate, indicating that the service life of the cross-array of memristors is prolonged. Compared with the basic method, the execution of LeNet-5 and ResNet-18 prolongs the service life by 2.7 and 2.5 times, respectively.

It can be seen from the above results that the present invention can achieve a better reasoning accuracy rate in the cross-array of memristors with a certain degree of aging by retraining the network, and the number of online hardware adjustments required to achieve the target accuracy rate is less, thus prolonging the service life of the memristor-based cross-array.

This patent is not limited to the network tasks described above. The embodiments are used to explain and not to limit the present invention. Under the inspiration of the patent, anyone can use this method with other network tasks under the cross-array of the aging memristors to improve the reasoning accuracy rate and prolong the service life of the cross-array of memristors. Within the spirit of the present invention and the protection scope of the claims, all equal changes and modifications made in accordance with the scope of the present patent application shall be covered by the present invention.

What is claimed is:

1. A neural network retraining method based on aging sensing of a memristor, wherein the method comprises following steps:

S1: sensing aging information from measurement data of the memristor and calculating an effective programmable resistance range of an aged memristor as:

$$R_{max}^{aged}=R_{max}^{fresh}-G(T,t)$$

$$R_{min}^{aged}=R_{min}^{fresh}-H(T,t)$$

wherein, $R_{max}^{aged}$ and $R_{min}^{aged}$ are respectively a maximum value and a minimum value of a programmable resistance after aging of memristors of a cross-array; $R_{max}^{fresh}$ and $p_{min}^{fresh}$ are respectively a maximum programmable resistance and a minimum programmable resistance that can be stored in a new memristor; and G(T,t) and H(T,t) are Arrhenius aging equations, wherein T is a measured temperature of a memristor and t is a time of aging of the memristor, and parameters of the Arrhenius aging equations are be extracted through the measurement data;

S2: based on the effective programmable resistance calculated in S1, calculating reciprocal values respectively to obtain a programmable conductivity range of the aged memristor in which the maximum and minimum values are respectively $G_{max}^{aged}$ and raged $G_{min}^{aged}$, and calculating a maximum value and a minimum value of programmable weight parameters in a neural network task to be executed by a neural network according to following formula:

$$W_{min}^{aged} = (G_{min}^{aged} - G_{min}^{fresh})\frac{W_{max} - W_{min}}{G_{max}^{fresh} - G_{min}^{fresh}} + W_{min}$$

$$W_{max}^{aged} = (G_{max}^{aged} - G_{min}^{fresh})\frac{W_{max} - W_{min}}{G_{max}^{fresh} - G_{min}^{fresh}} + W_{min}$$

wherein $G_{max}^{fresh}$ and $G_{min}^{fresh}$ are respectively a maximum conductance and a minimum conductance that can be stored in the new memristor in the cross-array, and $W_{min}^{aged}$ are $W_{min}^{aged}$ respectively a maximum value and a minimum value of the programmable weights corresponding to the cross-array, and $W_{max}$ and $W_{min}$ are respectively a maximum value and a minimum value of synaptic weights in an initial model of the neural network;

S3: retraining an existing neural network model based on the minimum value and the maximum value of the programmable weight parameters of the neural network to obtain retrained, adjusted programmable synaptic weight parameters;

S4: mapping the retrained adjusted programmable synaptic weight parameters of the neural network to the cross-array based on the memristor so as to measure a resistance value of a basic memory device;

S5: classifying derivatives into two groups according to a positive value or a negative value of derivatives obtained by performing a neural network backward propagation method on the neural network, calculating the average values of the two groups of derivatives of the positive value and the negative value respectively, and ignoring the derivatives of which absolute values are lower than an average values by setting the derivatives as 0; and then performing online hardware fine tuning on a resistance value stored in a corresponding memristor according to a current derivative value by applying a positive voltage or a negative voltage corresponding to a derivative symbol to the memristor, where the voltage applied to the memristor is calculated as:

$$V_{ij} = \begin{cases} +V_0 & \text{if } grad_{ij} < 0 \\ -V_0 & \text{if } grad_{ij} > 0 \end{cases}$$

wherein, $grad_{ij}$ is the derivative obtained by calculating the derivative of neural network Loss function value Loss with respect to weight $w_{ij}$, Loss is a hardware reasoning result and an actual loss function value; $V_0$ is a standard voltage applied to a memristor memory device during online adjustment; $V_{ij}$ is the voltage applied to the memristor memory device in row i and column j of the cross-array; and repeating the steps until an accuracy rate of the neural work is larger than a predetermined value, which is manually specified.

2. The neural network retraining method based on the aging sensing of memristors according to claim 1, wherein S3 specifically comprises:

truncating a weight beyond a range of programmable parameters and directly assigning the truncated weight as a maximum weight value or a minimum weight value nearest to a current value, and based on current truncated parameters, propagating backward the neural network to obtain the derivatives and continuing to adjust the parameters; and repeating the above truncating, assigning, propagating and continuing operations until the current truncated parameters meet a programmable weight range and an accuracy rate of a simulation reasoning is not reduced.

3. The neural network retraining method based on the aging sensing of memristors according to claim 2, wherein S4 specifically comprises:

S4.1: according to a mapping relationship between the weight and a conductance, calculating the conductance value G that should be stored in all of the memristors of the cross-array corresponding to all of the synaptic weights W of the neural network, wherein the mapping relationship is as follows:

$$G = \frac{G_{max} - G_{min}}{W_{max} - W_{min}}(W - W_{min}) + G_{min}$$

wherein, $W_{max}$ and $W_{min}$ are respectively a maximum value and a minimum value of the synaptic weights in the neural network model, and $G_{max}$ and $G_{min}$ are respectively a maximum value and a minimum value of a programmable effective conductance of the memristor;

S4.2: according to a reciprocal relationship between the conductance and the resistance value, calculating a reciprocal of a calculated conductance to obtain the resistance value that should be stored in all of the memristors in the cross-array: R=1/G, and, $R_{max}=1/G_{min}$ and $R_{min}=1/G_{max}$, $R_{max}$ and $R_{min}$ are respectively a maximum value and a minimum value of the programmable resistance value of the memristor; S4.3: applying a voltage to the memristor memory device corresponding to a synaptic position of the neural network so as to store a nearest quantized resistance value corresponding to a calculated resistance value R.

4. The neural network retraining method based on the aging sensing of memristors according to claim 3, wherein, in S2, calculating the programmable the maximum value and the minimum value of the weights of the neural network is performed with a maximum value and a minimum value of each layer respectively searched according to the programmable weight of each layer of a current neural network, and a minimum value or a maximum value of a current programmable conductance of the memristor corresponding to each layer of the neural network.

5. The neural network retraining method based on the aging sensing of memristors according to claim 2, wherein, in S2, calculating the maximum value and the minimum value of the programmable weights of the neural network is performed with a maximum value and a minimum value of each layer respectively searched according to the programmable weight of each layer of a current neural network, and a minimum value or a maximum value of a current programmable conductance of the memristor corresponding to each layer of the neural network.

6. The neural network retraining method based on the aging sensing of memristors according to claim 1, wherein, in S2, calculating the programmable the maximum value and the minimum value of the weights of the neural network is performed with a maximum value and a minimum value of each layer respectively searched according to the programmable weight of each layer of a current neural network, and a minimum value or a maximum value of a current programmable conductance of the memristor corresponding to each layer of the neural network.

* * * * *